US010990422B2

(12) United States Patent
Takeuchi

(10) Patent No.: US 10,990,422 B2
(45) Date of Patent: Apr. 27, 2021

(54) INFORMATION PROCESSING DEVICE, INFORMATION PROCESSING METHOD AND PROGRAM

(71) Applicant: Sony Corporation, Tokyo (JP)

(72) Inventor: Yasuo Takeuchi, Tokyo (JP)

(73) Assignee: Sony Corporation

( * ) Notice: Subject to any disclaimer, the term of this patent is extended or adjusted under 35 U.S.C. 154(b) by 0 days.

(21) Appl. No.: 16/281,744

(22) Filed: Feb. 21, 2019

(65) Prior Publication Data

US 2019/0179654 A1 Jun. 13, 2019

Related U.S. Application Data

(63) Continuation of application No. 14/937,103, filed on Nov. 10, 2015, now Pat. No. 10,268,494, which is a (Continued)

(30) Foreign Application Priority Data

Dec. 7, 2009 (JP) .................................. 2009-277924

(51) Int. Cl.
*G06F 9/46* (2006.01)
*G06F 9/455* (2018.01)
(Continued)

(52) U.S. Cl.
CPC .......... *G06F 9/455* (2013.01); *G06F 9/45537* (2013.01); *G07F 7/1008* (2013.01); *G06F 9/46* (2013.01); *G06F 9/54* (2013.01)

(58) Field of Classification Search
None
See application file for complete search history.

(56) References Cited

U.S. PATENT DOCUMENTS 5,761,486 A * 6/1998 Watanabe ............... H04L 43/00
703/21
6,808,111 B2 10/2004 Kashef et al.
(Continued)

FOREIGN PATENT DOCUMENTS

JP H06309531 A 11/1994
JP 11120300 4/1999
(Continued)

OTHER PUBLICATIONS

Partial European Search Report from EP Application No. 10192517, dated Dec. 2, 2013.
(Continued)

*Primary Examiner* — Kenneth Tang
(74) *Attorney, Agent, or Firm* — Lerner, David, Littenberg, Krumholz & Mentlik, LLP

(57) ABSTRACT

There is provided an information processing device including a receiving unit for receiving a command to be input to a first operating system and a command to be input to a second operating system different from the first operating system, a storage unit for storing a table in which given information included in the given command received by the receiving unit and information for identifying an application are related to each other, a generation unit for generating an application selection command for selectively executing the application based on the given command received by the receiving unit and the table stored in the storage unit, and an execution unit for executing the application selection command generated by the generation unit to selectively execute the application.

10 Claims, 11 Drawing Sheets

Related U.S. Application Data continuation of application No. 12/927,889, filed on Nov. 29, 2010, now Pat. No. 9,208,633.

(51) Int. Cl.
    *G07F 7/10*     (2006.01)
    *G06F 9/54*     (2006.01)

(56) References Cited

U.S. PATENT DOCUMENTS

| | | | |
|---|---|---|---|
| 7,365,642 | B2 | 4/2008 | Tabayashi et al. |
| 9,208,633 | B2 | 12/2015 | Takeuchi |
| 10,268,494 | B2 * | 4/2019 | Takeuchi .............. G07F 7/1008 |
| 2002/0175207 | A1 | 11/2002 | Kashef et al. |
| 2004/0006632 | A1 | 1/2004 | Cheng |
| 2005/0105559 | A1 | 5/2005 | Cain et al. |
| 2008/0077382 | A1 | 3/2008 | Strehl |
| 2008/0178265 | A1 * | 7/2008 | Tsuchiya .............. G06Q 20/341 726/3 |
| 2008/0185433 | A1 * | 8/2008 | Ando ................ H04M 1/72525 235/439 |
| 2009/0064301 | A1 | 3/2009 | Sachdeva et al. |
| 2009/0138872 | A1 | 5/2009 | Fuchs et al. |
| 2009/0166421 | A1 * | 7/2009 | Finn ..................... G06K 7/0008 235/439 |
| 2010/0043016 | A1 | 2/2010 | Anzai |
| 2010/0169072 | A1 * | 7/2010 | Zaki ......................... G06F 8/30 703/28 |
| 2010/0169470 | A1 * | 7/2010 | Takashige ................. G06F 8/63 709/223 |
| 2011/0010755 | A1 * | 1/2011 | Virtanen ............ G06Q 20/3574 726/2 |
| 2011/0137631 | A1 * | 6/2011 | Komatsu ............. G06F 11/3668 703/6 |
| 2011/0280406 | A1 * | 11/2011 | Ma .......................... H04B 5/02 380/278 |
| 2012/0021683 | A1 * | 1/2012 | Ma ...................... H04L 63/0876 455/41.1 |
| 2018/0262388 | A1 * | 9/2018 | Johnson ................. H04L 41/28 |

FOREIGN PATENT DOCUMENTS

| | | |
|---|---|---|
| JP | 2002279372 A | 9/2002 |
| JP | 2003030596 A | 1/2003 |
| JP | 2003076954 A | 3/2003 |
| JP | 2004139244 A | 5/2004 |
| JP | 2004151864 A | 5/2004 |
| JP | 2005242445 A | 9/2005 |
| JP | 2005301657 A | 10/2005 |
| JP | 2007122289 A | 5/2007 |
| JP | 2009271836 A | 11/2009 |
| JP | 2009277924 A | 11/2009 |
| WO | 02/005095 | 1/2002 |

OTHER PUBLICATIONS

Office Action from Japanese Application No. 2009-277924, dated Nov. 26, 2013.
Office Action from Japanese Application No. 2009-277924, dated Mar. 4, 2014.
European Search Report from EP Application No. 10192517, dated Feb. 27, 2014.
Japanese Office Action for JP Application No. 2014115561, dated Mar. 31, 2015.
Japanese Office Action for Japanese Publication No. 2014115561 dated Jan. 5, 2016.
EP Office Action for Application No. EP10192517.0 dated Aug. 8, 2017.

\* cited by examiner

FIG. 4A

TBL1A

| AREA INFORMATION | APPLICATION IDENTIFICATION INFORMATION |
|---|---|
| AAAA | 0001 |
| BBBB | 0002 |
| CCCC | 0003 |

FIG. 4B

TBL1B

| AREA INFORMATION | RESPONSE FLAG (RESPONSE: 0, STOP: 1) |
|---|---|
| AAAA | RESPONSE |
| BBBB | STOP |
| CCCC | RESPONSE |

| APPLICATION IDENTIFICATION INFORMATION | APPLICATION STORAGE AREA |
|---|---|
| 0001 | ADDRESSES 0-1000 |
| 0002 | ADDRESSES 1000-1500 |
| 0003 | ADDRESSES 1500-2200 |

INFORMATION PROCESSING DEVICE, INFORMATION PROCESSING METHOD AND PROGRAM

CROSS-REFERENCE TO RELATED APPLICATIONS

The present application is a continuation of U.S. application Ser. No. 14/937,103, filed on Nov. 10, 2015, which is a continuation of U.S. application Ser. No. 12/927,889, filed on Nov. 29, 2010, which claims the benefit of Japan Application No. JP 2009-277924, filed on Dec. 7, 2009, the disclosures of which are incorporated herein by reference.

BACKGROUND OF THE INVENTION

Field of the Invention

The present invention relates to an information processing device, an information processing method, and a program.

Description of the Related Art

Traditionally, integrated circuit (IC) cards having an IC capable of performing information recording or operation have been increasingly applied. Particularly, in recent years, an IC card called a smart card with a processor included in an IC for realizing advanced information processing has been widely used for several purposes as a payment means or personal identification means in daily life.

Information processing on an IC card is usually performed in response to a received command that is given from an external device capable of communicating with the IC card. Commands given to the IC card include various commands for causing the IC card to execute information input/output or operations, a security process, and the like. Here, a number of recently developed IC cards have an operating system (hereinafter, referred to as an OS), which is a base on which such a command group is executed, installed in a circuit. A plurality of types of OSs may be installed in the IC card in order to enable the IC card to be carried between a plurality of external devices conforming to different standards and increase the versatility of the IC card.

For example, a technique described in Japanese Patent Laid-open Publication No. 2005-242445 is known as a technique related to the IC card having a plurality of OSs installed therein. For example, a technique is disclosed in Japanese Patent Laid-open Publication No. 2005-242445 in which even when structures of delivered messages differ between contact communication with an external device and contactless communication with the external device, a process corresponding to each message can be performed.

SUMMARY OF THE INVENTION

In an IC card having a plurality of OSs installed therein, any OS may be operated on an execution environment of another OS. For example, in an IC card having a plurality of OSs, such as a Java (registered trademark) card OS and a FeliCa (registered trademark) OS, installed therein, one may wish to run the FeliCa OS on an execution environment of the Java Card OS by incorporating an application simulating the FeliCa OS into the Java Card OS, instead of installing the FeliCa OS. When the application simulating the FeliCa OS is executed on the execution environment of the Java Card OS, the same processing result as generated when the FeliCa OS is run is obtained. The above-described application simulating the FeliCa OS is one modified to perform control via the execution environment of the Java Card OS except for an access control or task scheduling function, an encryption function, register setting, and the like around hardware managed by an original OS, and is one changed to execute functions such as file system management, a command parsing function, a process dependent on command content, and response generation. If a virtual machine such as VM Ware (registered trademark) is built on the card, a current OS may be installed in its form and, in this case, the application simulating the FeliCa OS is the same in meaning as a FeliCa OS capable of being run on a different execution environment.

Provision of limited functions or some functions of the OS in an extracted form, as well as implantation of all functions in their entirety, is included in a category of realizable forms indicated by the present application. In this case, since the Java Card OS allows a function to be added as an application later, the FeliCa OS can be added later, if necessary. A partially simulating application can realize replacement of a variety of services by being added or deleted to or from the Java Card OS later as a form of providing one service.

However, when the application simulating the FeliCa OS is executed on the execution environment of the Java Card OS as described above, since the execution environment on which the FeliCa OS is run is different from usual, a transfer protocol or a command format used in a typical FeliCa OS is unavailable due to constraints of an interface of the Java Card OS. Further, it is not preferable to change specifications of commands transmitted by an external device.

In light of the foregoing, it is desirable to provide a novel and improved information processing device, information processing method, and program capable of causing an OS run on an execution environment different from usual to execute commands from an external device without changing specifications of the commands from the external device.

According to an embodiment of the present invention, there is provided an information processing device, including a receiving unit for receiving a command to be input to a first operating system and a command to be input to a second operating system different from the first operating system, a storage unit for storing a table in which given information included in the given command received by the receiving unit and information for identifying an application are related to each other, a generation unit for generating an application selection command for selectively executing the application based on the given command received by the receiving unit and the table stored in the storage unit, and an execution unit for executing the application selection command generated by the generation unit to selectively execute the application.

The execution unit may output the same processing result as generated by the second operating system by executing a given application on an execution environment of the first operating system.

The given command may be an information acquisition command for selecting a given memory area corresponding to the second operating system, and the given information may be area information for identifying the given memory area, included in the information acquisition command.

The information processing device may further include a discrimination unit for discriminating the type of the command received by the receiving unit. The discrimination unit may discriminate whether the command is the application selection command after discriminating whether the command is the information acquisition command in discriminating the type of the command.

The information processing device may include a format check unit for performing check of a format of the command received by the receiving unit. The format check unit may stop the check of the format of the command when a given application is executed by the execution unit.

When the receiving unit receives a command, a determination of a response corresponding to the received command may be made based on a state of a response flag added to the table stored in the storage unit.

According to another embodiment of the present invention, there is provided an information processing method, including the steps of receiving a command to be input to a first operating system and a command to be input to a second operating system different from the first operating system, generating an application selection command for selectively executing an application based on the given command received in the receiving step and a table in which given information included in the given command received in the receiving step and information for identifying an application are related to each other, and executing the application selection command generated in the generation step to selectively execute the application.

According to another embodiment of the present invention, there is provided a program for causing a computer to function as a receiving unit for receiving a command to be input to a first operating system and a command to be input to a second operating system different from the first operating system, a storage unit for storing a table in which given information included in the given command received by the receiving unit and information for identifying an application are related to each other, a generation unit for generating an application selection command for selectively executing the application based on the given command received by the receiving unit and the table stored in the storage unit, and an execution unit for executing the application selection command generated by the generation unit to selectively execute the application.

According to another embodiment of the present invention, there is provided an information processing device, including a receiving unit for receiving a command to be input to a first operating system and a command to be input to a second operating system different from the first operating system, a storage unit for storing a table in which given information included in the given command received by the receiving unit and information of an application are related to each other, and an execution unit for selectively executing the application based on the given command received by the receiving unit and the table stored in the storage unit.

According to the present invention as described above, it is possible to cause an application simulating an OS run on an execution environment different from usual to execute commands from an external device without changing specifications of the commands from the external device.

BRIEF DESCRIPTION OF THE DRAWINGS

FIG. 4A illustrates an example of a table TBL1A stored in a storage unit of the information processing device in FIG. 1;

FIG. 4B illustrates an example of a table TBL1B with a response flag stored in a storage unit of the information processing device in FIG. 1;

DETAILED DESCRIPTION OF THE EMBODIMENT(S)

Figure 1:
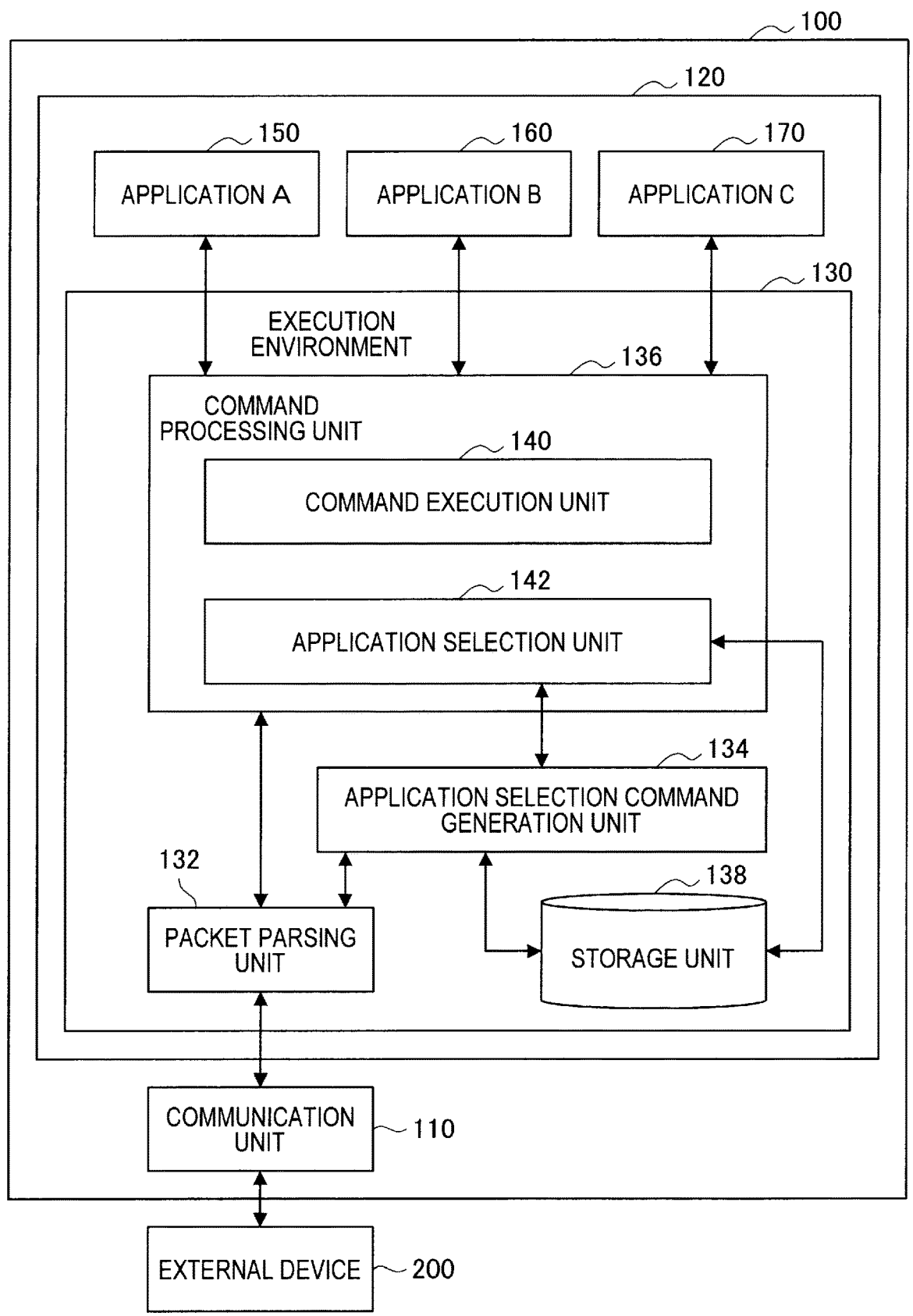
FIG. 1 is a block diagram mainly showing a schematic configuration of the information processing device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Information Processing Device according to First Embodiment of the Present Invention
2. Flowchart of Information Processing
3. Information Processing Device according to Second Embodiment of the Present Invention
4. Flowchart of Information Processing
5. Variant of Information Processing Device according to each Embodiment of the Present Invention
6. Flowchart of Format Check Process
7. Flowchart of Another Format Check Process Information Processing Device According to First Embodiment of the Present Invention First, an information processing device according to a first embodiment of the present invention will be described. FIG. 1 is a block diagram mainly showing a schematic configuration of the information processing device according to the first embodiment of the present invention. An external device 200 and an information processing device 100 are shown in FIG. 1.

In FIG. 1, the external device 200 is a communication device capable of communicating with the information processing device 100. For example, the external device 200 may be a reader/writer for reading/writing information recorded in the information processing device 100. Alternatively, the external device 200 may be an information processing device that provides any application to a user using functions of the information processing device 100.

Meanwhile, the information processing device 100 is typically realized as, for example, a contact or contactless IC card or chip. Alternatively, the information processing device 100 may be, for example, a communication module provided in an information communication terminal, such as a portable telephone. The information processing device 100 provides a group of commands for executing input/output or various operations for information recorded by the information processing device 100, as described below. When a command is input from the external device 200, the information processing device 100 executes a process corresponding to the command and outputs a response to the external device 200.

The information processing device 100 includes a communication unit 110, and an operating system (hereinafter, referred to as an "OS") 120.

The communication unit 110 is an example of the receiving unit of the present invention, and is a communication interface that relays communication of the information processing device 100 with the external device 200. Inputting the command from the external device 200 to the information processing device 100 and outputting the response from the information processing device 100 to the external device 200 are performed via the communication unit 110. For example, when the information processing device 100 performs contactless communication with the external device 200, the communication unit 110 can be realized as, for example, a communication interface conforming to a standard, such as ISO/IEC14443 or ISO/IEC18092 (also called near field communication; NFC). When the communication interface such as NFC is realized as a separate device or module, the communication unit 110 is an interface for communicating with such a device, and communicates with the external device 200 via the device. For example, when a communication module is provided as a contactless front end (CLF) in the outside, the communication unit 110 operates as a module that controls an interface such as HCI/SWP defined in the European Telecommunications Standards Institute (ETSI).

The OS 120 executes input/output or given operations for the information held by the information processing device 100 according to the input command. In this disclosure, a set of commands that can be executed by the information processing device 100 is referred to as a command group. For example, the OS 120 may be a Java Card (registered trademark) OS. For example, the Java Card OS is an example of the first OS of the present invention.

The OS 120 includes an execution environment 130, application A 150, application B 160, and application C 170.

The execution environment 130 is a software group that is a base on which the OS 120 executes the command group. The execution environment 130 mainly includes a packet parsing unit 132, an application selection command generation unit 134, a command processing unit 136, and a storage unit 138. The command processing unit 136 mainly includes a command execution unit 140 and an application selection unit 142.

When a communication packet received by the communication unit 110 is input, the packet parsing unit 132 parses content of the communication packet, and identifies the type of a command for the OS 120 included in the communication packet. Examples of the type of the command include an information acquisition command to detect a card having FeliCa OS installed therein and acquire information from the OS, an application selection command to select an application to be executed by the OS 120, and another command. In this case, the command included in the communication packet may be stored in a temporary storage unit (not shown).

Figure 2:
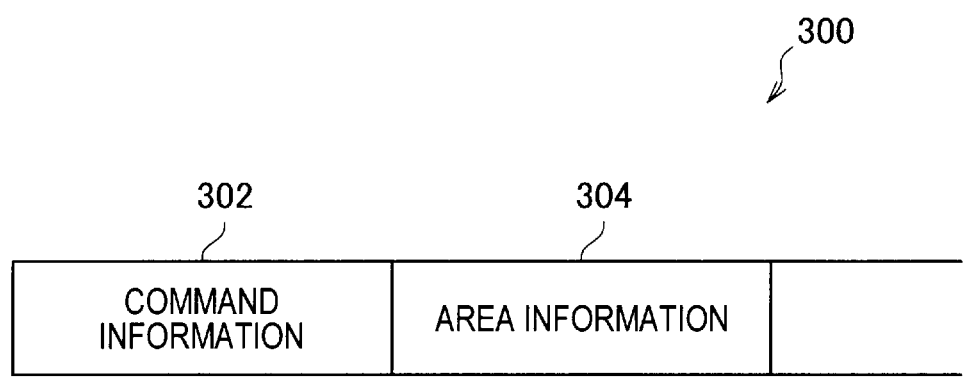
FIG. 2 illustrates an example of a format of an information acquisition command received by the information processing device in FIG. 1.

FIG. 2 illustrates an example of a format of the information acquisition command received by the information processing device 100 in FIG. 1. In FIG. 2, the information acquisition command 300 has command information 302 and area information 304. For example, a command code for identifying the type of the command, a parameter for executing the command, and so on are included in the command information 302. Meanwhile, for example, area information for identifying a given memory area held by the FeliCa OS or an application simulating the FeliCa OS is included in the area information 304.

The packet parsing unit 132 is an example of the discrimination unit of the present invention. For example, when the command received from the external device 200 is identified as the information acquisition command 300 by referring to the command code included in the command information 302, the packet parsing unit 132 inputs this command to the application selection command generation unit 134. On the other hand, when the command received from the external device 200 is identified as the application selection command or the other command, the packet parsing unit 132 inputs this command to the command processing unit 136. When the command received from the external device 200 is identified as the application selection command, the packet parsing unit 132 inputs this command to the application selection unit 142 of the command processing unit 136. Thereafter, when a response corresponding to the above-described command is output from the command processing unit 136, the packet parsing unit 132 transmits the response to the external device 200 via the communication unit 110.

Figure 3:
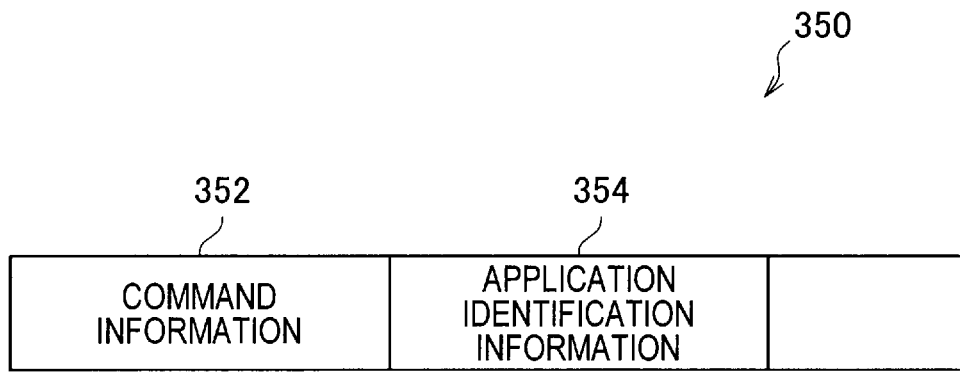
FIG. 3 illustrates an example of a format of an application selection command input to a command processing unit of the information processing device in FIG. 1.

When the information acquisition command 300 is input by the packet parsing unit 132, the application selection command generation unit 134 reads a table TBL1 in which the area information and the application identification information are related to each other, as shown in FIG. 4A, from the storage unit 138. The application selection command generation unit 134 discriminates the application identification information related to the area information 304 included in the input information acquisition command 300 by referring to the read table TBL1. For example, when the area information 304 included in the information acquisition command 300 is "AAAA," "0001" is discriminated as the application identification information. In the present embodiment, the application identification information corresponding to application A 150 is assumed to be "0001." The application identification information is information for identifying an application managed by the OS 120, such as Java Card OS. After discriminating the application identification information, the application selection command generation unit 134 generates an application selection command 350 for selecting an application to be executed by the OS 120, as shown in FIG. 3. The application selection command generation unit 134 inputs the generated application selection command 350 to the application selection unit 142 of the command processing unit 136.

In the case where a response flag corresponding to the area information 304 is given in TBL1B as shown in FIG. 4B, when the flag is set as "non-response," the application selection command generation unit 134 determines that a process of discriminating related application identification information from the area information 304 is unnecessary, and does not respond or returns an error for the command received from the external device 200 to the external device. When the flag is set as "response," the application selection command generation unit 134 generates the application selection command 350 as described above, and delivers the command to the application selection unit 142.

FIG. 3 illustrates an example of a format of the application selection command input to the command processing unit 136 of the information processing device 100 in FIG. 1. In FIG. 3, the application selection command 350 has command information 352 and application identification information 354. For example, a command code for identifying the type of the command, a parameter for executing the command, and the like are included in the command information 352. Meanwhile, identification information of the application to be executed by the OS 120 and the like are included in the application identification information 354. The format is a format simulating a command delivered as the application selection command from the external device. However, when the application selection unit 142 is already decomposing the information into respective elements for parsing, the application selection command may be input according to a corresponding format. In this case, delivery of parameters for an interface between modules, such as an API, without the command code is one example.

Figure 5:
FIG. 5 illustrates an example of a table TBL2 stored in a storage unit of the information processing device in FIG. 1.

The command processing unit 136 mainly includes the command execution unit 140 and the application selection unit 142. The command execution unit 140 executes commands other than the application selection command 350 input to the command processing unit 136. The application selection unit 142 is an example of the execution unit of the present invention, and executes the application selection command 350 input to the command processing unit 136. For example, the application selection unit 142 reads a table TBL2 in which application identification information and an application storage area are related to each other as shown in FIG. 5, from the storage unit 138. TBL2 is a table in which the application identification information and the storage area correspond to each other for management, which are managed by the OS 120, such as Java Card OS. This management method is one example and does not necessarily use the table, and the application storage area may be managed by repeating a start point and an end point, like a list. The application selection unit 142 determines an application storage area related to the application identification information 354 included in the input application selection command 350 by referring to the read table TBL2. For example, when the application identification information 354 included in the application selection command 350 is "0001," the application selection unit 142 designates "addresses 0-1000," that is, memory addresses at which application A 150 is stored, to discriminate an executable program of the application. This memory address is assumed to be a relative address numbered by logically parsing a memory managed by the Java Card OS. However, when the OS directly manages the memory using a physical address, an absolute address of an identifier of the physical memory, an address and the like may be employed. After discriminating the executable program of the application, the command execution unit 140 executes the discriminated executable program of the application. The command processing unit 136 outputs a response to the command executed by the command execution unit 140 or the application selection unit 142 to the packet parsing unit 132.

The response flag for the area information shown in FIG. 4B can be set as "response" or "non-response" from the executable program and the set content of the flag is changed according to a state held by the executable program. When the application is unselected or the card is powered off, it is difficult to set the flag from the application. Accordingly, in this case, default value setting or value initialization is performed by the OS.

In a flag setting flow, all flags are initialized when the OS starts up, and are set by a selected executable program. When the executable program is unselected, the OS re-initializes the corresponding flag.

When the OS re-initializes the flag, since the OS knows the unselected executable program, the OS extracts the application identification information from the executable program, calculates area information from the application identification information, and re-initializes the response flag corresponding to the area information.

Application A 150, application B 160, and application C 170 are any applications run on the OS 120. In the present embodiment, application A 150 is, for example, an application simulating the FeliCa (registered trademark) OS. When this application A 150 is executed on the execution environment 130 of the OS 120, the same processing result as generated when the FeliCa OS is run is obtained. For example, the FeliCa OS is an example of the second operating system of the present invention. Here, the term "application" includes an applet, software including only simpler logic, and the like.

Information Processing

Figure 6:
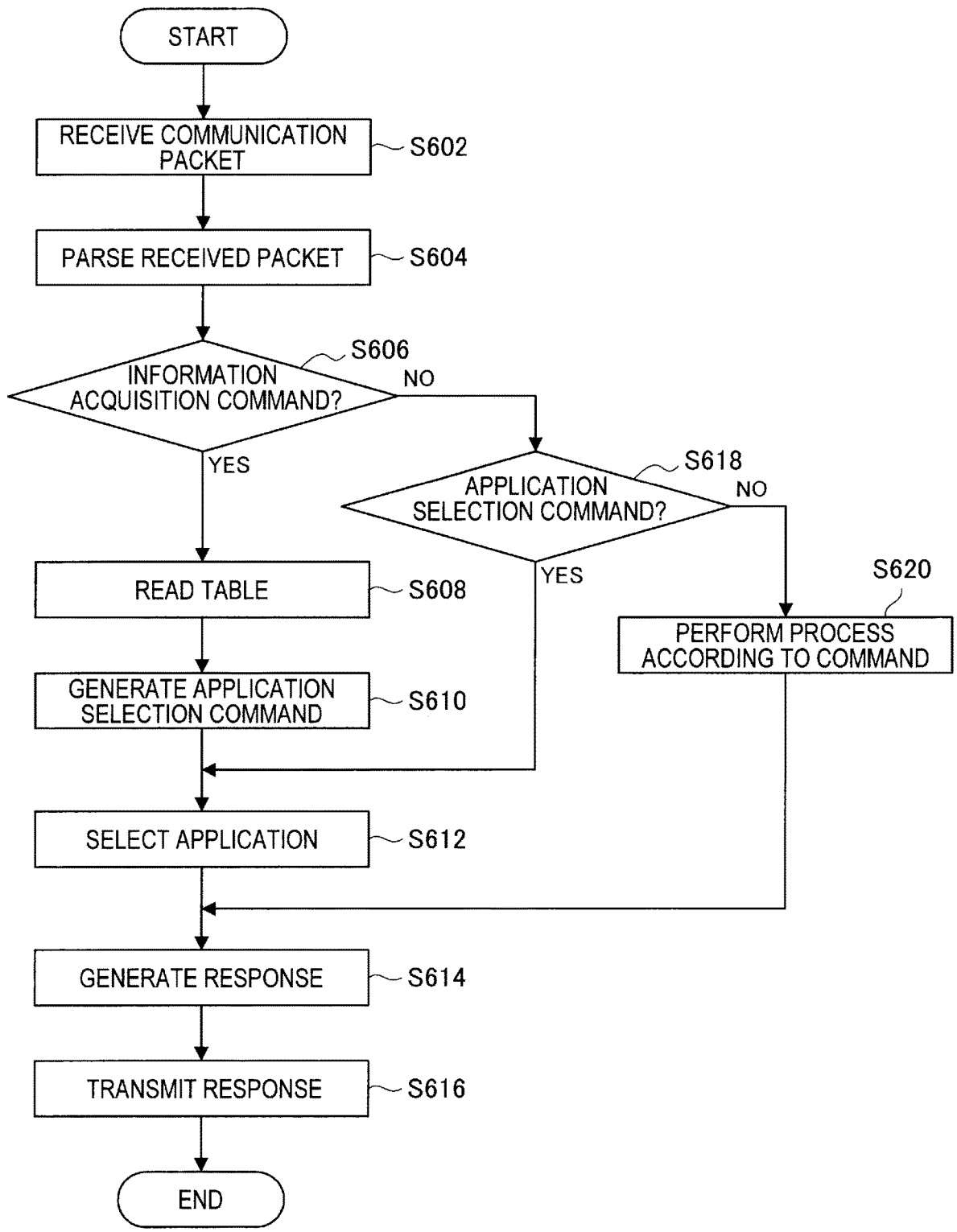
FIG. 6 is a flowchart of information processing executed by the information processing device in FIG. 1.

Hereinafter, information processing executed by the information processing device 100 in FIG. 1 will be described. FIG. 6 is a flowchart of information processing executed by the information processing device 100 in FIG. 1.

In FIG. 6, first, the communication unit 110 of the information processing device 100 receives a communication packet from the external device 200 (step S602) and transmits the received communication packet to the packet parsing unit 132.

The packet parsing unit 132 of the information processing device 100 then parses the communication packet received from the communication unit 110 (step S604). The packet parsing unit 132 of the information processing device 100 discriminates whether a command included in the communication packet is the above-described information acquisition command based on the parsing of the communication packet in step S604 (step S606).

When the command included in the communication packet is found to be the information acquisition command as a result of the discrimination in step S606 (YES in step S606), the packet parsing unit 132 of the information processing device 100 inputs the information acquisition command to the application selection command generation unit 134 of the information processing device 100. The application selection command generation unit 134 of the information processing device 100 reads the table TBL1A shown in FIG. 4A from the storage unit 138 (step S608), and generates an application selection command shown in FIG. 3 including application identification information related to area information included in the input information acquisition command (step S610). The application selection command generation unit 134 inputs the application selection command generated in step S610 to the application selection unit 142 in the command processing unit 136 of the information processing device 100, and the information processing device proceeds to a process in step S612.

On the other hand, when the command included in the communication packet is found not to be the information acquisition command as a result of the discrimination in step S606 (NO in step S606), the packet parsing unit 132 of the information processing device 100 discriminates whether the command included in the communication packet is the above-described application selection command (step S618).

When the command included in the communication packet is found to be an application selection command as a result of the discrimination in step S618 (YES in step S618), the packet parsing unit 132 of the information processing device 100 inputs the application selection command to the application selection unit 142 in the command processing unit 136 of the information processing device 100, and the information processing device proceeds to the process in step S612.

In the process of the subsequent step S612, the application selection unit 142 of the information processing device 100 executes the input application selection command and selectively executes an application (step S612). For example, the application selection unit 142 of the information processing device 100 reads the table TBL2 shown in FIG. 5 from the storage unit 138, and executes an application corresponding to the application identification information included in the input application selection command. In the present embodiment, the application A 150 is an application simulating the FeliCa OS, and when the application A 150 is executed on the execution environment 130 of the OS 120, the same processing result as generated when the FeliCa OS is run is obtained. The information processing device proceeds to the process in step S614.

On the other hand, when the command included in the communication packet is found not to be the application selection command as a result of the discrimination in step S618 (NO in step S618), the packet parsing unit 132 of the information processing device 100 inputs another command to the command execution unit 140 in the command processing unit 136 of the information processing device 100.

The command execution unit 140 of the information processing device 100 then executes the other input command (step S620), and the information processing device proceeds to the process in step S614.

In the process in the subsequent step S614, the command processing unit 136 of the information processing device 100 generates a response including the execution result for the command executed by the command execution unit 140 or the application selection unit 142 (step S614). The command processing unit 136 of the information processing device 100 inputs the response generated in step S614 to the packet parsing unit 132 of the information processing device 100.

The packet parsing unit 132 of the information processing device 100 then transmits the input response to the external device 200 via the communication unit 110 (step S616), and the present processing ends.

According to information processing of FIG. 6, when the command included in the communication packet is the information acquisition command, the application selection command including the application identification information related to the area information included in the information acquisition command is generated and the generated application selection command is executed to selectively execute an application. For example, when application A 150 simulating the FeliCa OS is incorporated into the OS 120 instead of the FeliCa OS being installed in the information processing device 100, it is difficult to use a transfer protocol or a command format used in a typical FeliCa OS. However, the information acquisition command usually corresponds to the transfer protocol used in the FeliCa OS. When application A 150 simulating the FeliCa OS is selected and executed on the execution environment 130 of the OS 120 according to the above-described information processing, the same processing result as generated when the FeliCa OS is run is obtained. Thus, it is possible to cause an application simulating an OS run on an execution environment different from usual to execute the command from the external device 200 without changing a specification of the command from the external device 200.

Figure 7:
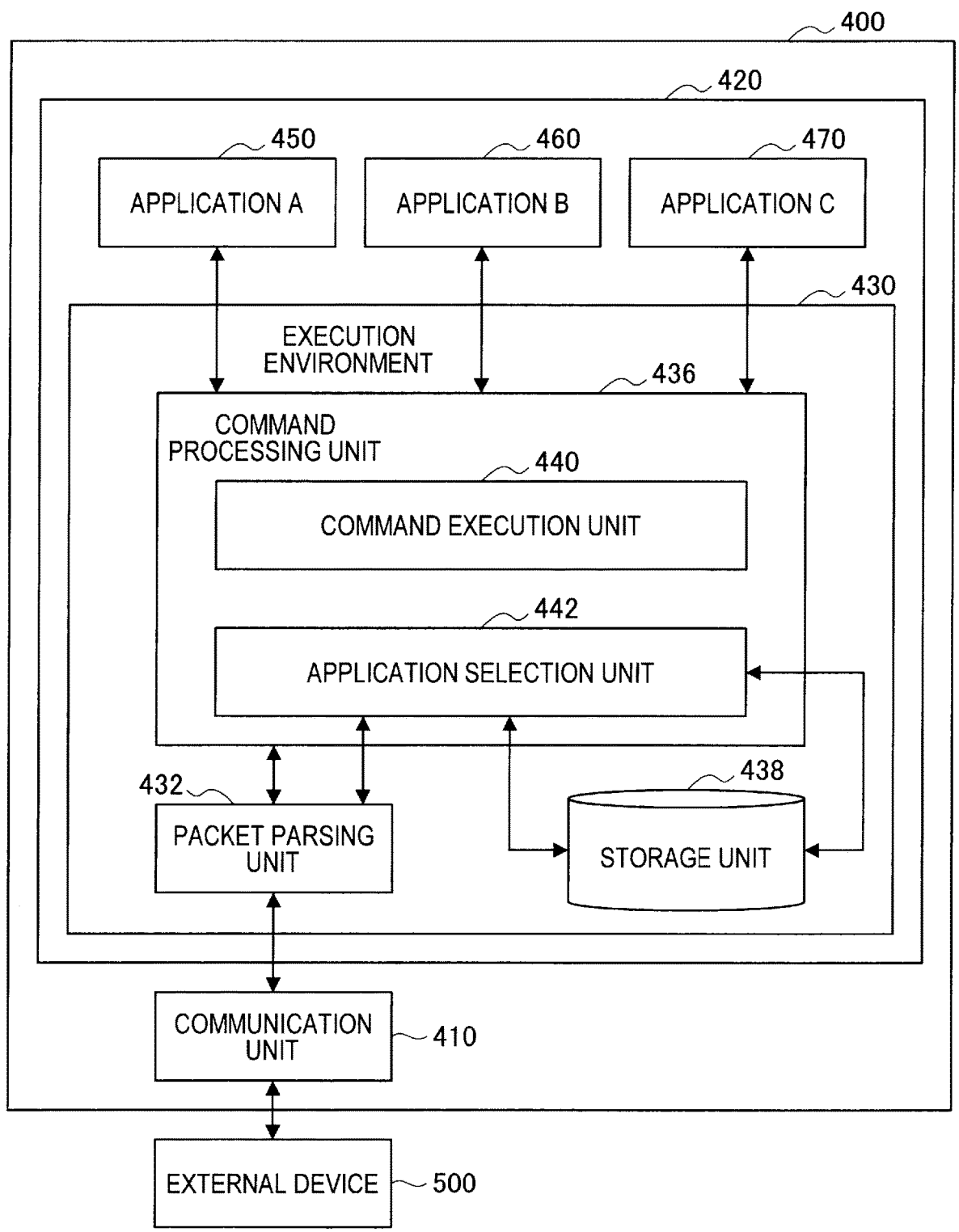
FIG. 7 is a block diagram mainly showing a schematic configuration of the information processing device according to a second embodiment of the present invention.

Information Processing Device According to
Second Embodiment of the Present Invention Hereinafter, an information processing device according to a second embodiment of the present invention will be described. The information processing device according to the second embodiment of the present invention differs from the information processing device according to the first embodiment of the present invention described above in that the former does not have an application selection command generation unit. Hereinafter, the information processing device according to the second embodiment of the present invention and, mainly, a difference from the information processing device according to the first embodiment of the present invention, will be described, and a detailed description of the same configuration as that of the information processing device according to the first embodiment of the present invention will be omitted. FIG. 7 is a block diagram mainly showing a schematic configuration of the information processing device according to the second embodiment of the present invention. In FIG. 7, the external device 500 and the information processing device 400 are shown.

In FIG. 7, the information processing device 400 includes a communication unit 410 and an OS 420. The OS 420 includes an execution environment 430, application A 450, application B 460, and application C 470. The communication unit 410 is an example of the receiving unit of the present invention. The execution environment 430 mainly includes a packet parsing unit 432, a command processing unit 436 and a storage unit 438. The command processing unit 436 mainly includes a command execution unit 440 and an application selection unit 442.

The packet parsing unit 432 is an example of the discrimination unit of the present invention. When a communication packet received by the communication unit 410 is input, the packet parsing unit 432 parses contents of the communication packet, and identifies the type of a command for the OS 420 included in the communication packet. When the packet parsing unit 432 identifies the command received from the external device 500 as an information acquisition command or an application selection command, the packet parsing unit 432 inputs the command to the application selection unit 442 in the command processing unit 436. On the other hand, when the packet parsing unit 432 identifies the command received from the external device 500 as another command, the packet parsing unit 432 inputs this command to the command execution unit 440 in the command processing unit 436. Thereafter, when a response corresponding to the above-described command is output from the command processing unit 436, the packet parsing unit 432 transmits the response to the external device 500 via the communication unit 410.

The command processing unit 436 mainly includes the command execution unit 440 and the application selection unit 442. The command execution unit 440 executes the other input command. The application selection unit 442 is an example of the execution unit of the present invention, and executes the information acquisition command or the application selection command input to the command processing unit 436. For example, the application selection unit 442 reads the table TBL1A in which the area information and the application are related to each other as shown in FIG. 4A from the storage unit 438 in executing the information acquisition command. The application selection unit 442 discriminates application identification information related to area information included in the input information acquisition command by referring to the read table TBL1A. For example, when the area information included in the information acquisition command is "AAAA", "0001" is discriminated as identification information of an application to be executed. After discriminating the application identification information, the application selection unit 442 calls for the discriminated application using designated application identification information. The application selection unit 442 finds an application storage location from the application identification information using TBL2 shown in FIG. 5. The command processing unit 436 outputs a response to the command executed by the command execution unit 440 or the application selection unit 442 to the packet parsing unit 432.

Application A 450, application B 460, and application C 470 are any applications that are run on the OS 420. In the present embodiment, application A 450 is, for example, an application simulating the FeliCa (registered trademark) OS. When this application A 450 is executed on the execution environment 430 of the OS 420, the same processing result as generated when the FeliCa OS is run is obtained.

Information Processing

Figure 8:
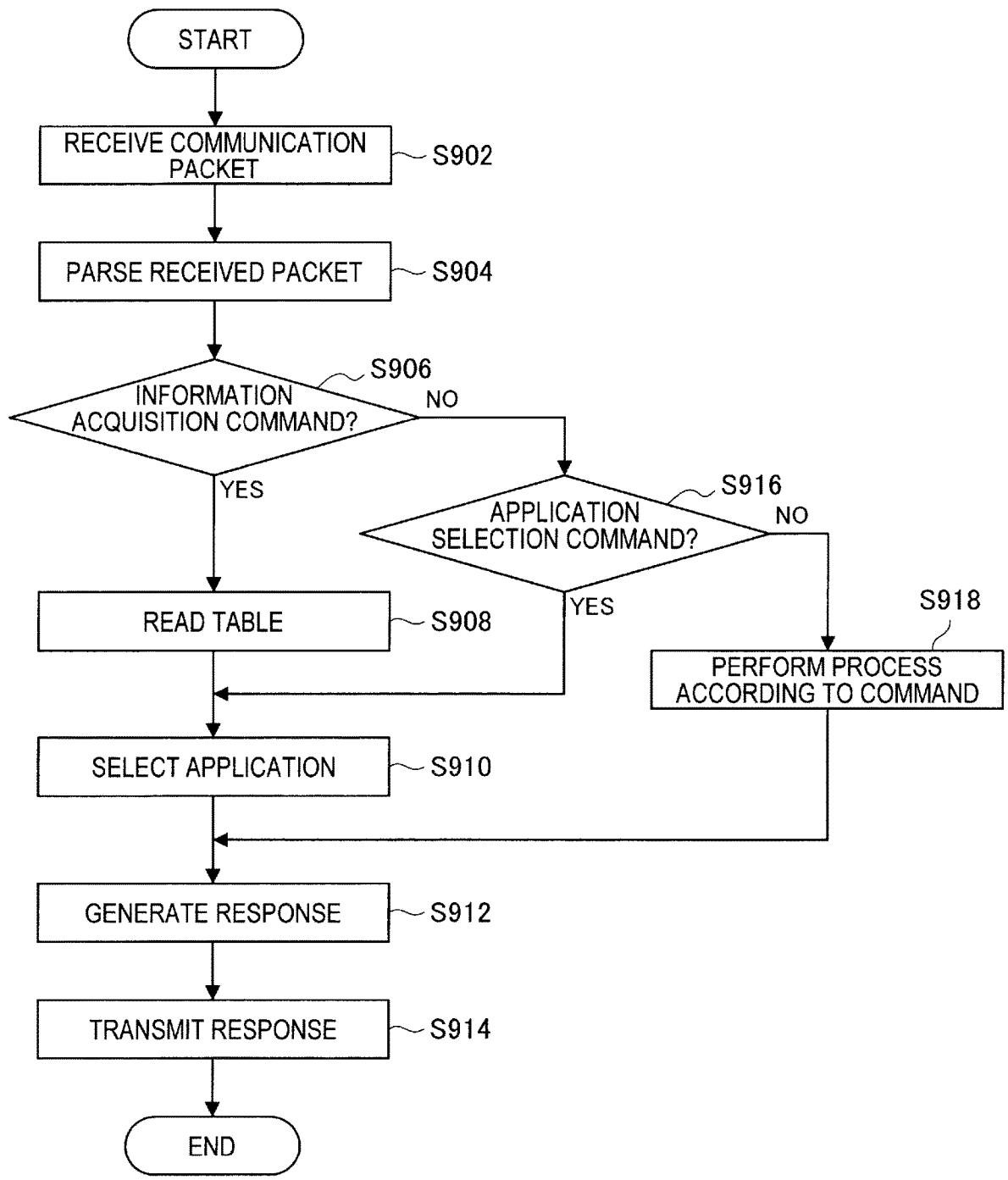
FIG. 8 is a flowchart of information processing executed by the information processing device in FIG. 7.

Hereinafter, information processing executed by the information processing device 400 in FIG. 7 will be described. FIG. 8 is a flowchart of information processing executed by the information processing device 400 in FIG. 7.

In FIG. 8, first, the communication unit 410 of the information processing device 400 receives a communication packet from the external device 500 (step S902), and transmits the received communication packet to the packet parsing unit 432.

The packet parsing unit 432 of the information processing device 400 then parses the communication packet received from the communication unit 410 (step S904). The packet parsing unit 432 of the information processing device 400 discriminates whether a command included in the communication packet is the above-described information acquisition command by parsing the communication packet in step S904 (step S906).

When the command included in the communication packet is found to be the information acquisition command as a result of the determination in step S906 (YES in step S906), the packet parsing unit 432 of the information processing device 400 inputs the information acquisition command to the application selection unit 442 in the command processing unit 436 of the information processing device 400. The application selection unit 442 of the information processing device 100 reads the table TBL1A or 2 shown in FIG. 4A or 5 from the storage unit 438 (step S908), and the information processing device proceeds to the process in step S910.

On the other hand, when the command included in the communication packet is found not to be the information acquisition command as the result of the discrimination in step S906 (NO in step S906), the packet parsing unit 432 of the information processing device 400 discriminates whether the command included in the communication packet is the above-described application selection command (step S916).

When the command included in the communication packet is found to be the application selection command as a result of the discrimination in step S916 (YES in step S916), the packet parsing unit 432 of the information processing device 400 inputs the application selection command to the application selection unit 442 in the command processing unit 436 of the information processing device 400, and the information processing device proceeds to the process in step S910.

In the process of the subsequent step S910, the application selection unit 442 of the information processing device 400 executes the input information acquisition command or application selection command to selectively execute an application (step S910). For example, when the information acquisition command is input, the application selection unit 442 of the information processing device 400 executes an application corresponding to the area information included in the input information acquisition command by referring to the table TBL1A or 2 read in step S908. In the present embodiment, application A 450 is an application simulating the FeliCa OS, and when application A 450 is executed on the execution environment 430 of the OS 420, the same processing result as generated when the FeliCa OS is run is obtained. The information processing device then proceeds to the process in step S912.

On the other hand, when the command included in the communication packet is found not to be the application selection command as the result of the discrimination in step S916 (NO in step S916), the packet parsing unit 432 of the information processing device 400 inputs the other command to the command execution unit 440 in the command processing unit 436 of the information processing device 400.

The command execution unit 440 of the information processing device 400 then executes the other input command (step S918), and the information processing device proceeds to the process in step S912.

In the process in the subsequent step S912, the command processing unit 436 of the information processing device 400 generates a response including an execution result for the command executed by the command execution unit 440 or the application selection unit 442 (step S912). The command processing unit 436 of the information processing device 400 inputs the response generated in step S912 to the packet parsing unit 432 of the information processing device 400.

The packet parsing unit 432 of the information processing device 400 then transmits the input response to the external device 500 via the communication unit 410 (step S914), and the present process ends.

According to information processing in FIG. 8, when the command included in the communication packet is the information acquisition command, the application corresponding to the area information included in the information acquisition command is selectively executed to execute the information acquisition command. Accordingly, the same effect as in the above-described information processing in FIG. 6 can be obtained. Since the information processing device 400 in FIG. 7 does not include the application selection command generation unit 134 unlike the information processing device 100 shown in FIG. 1, it is possible to simplify the above-described information processing.

Figure 9:
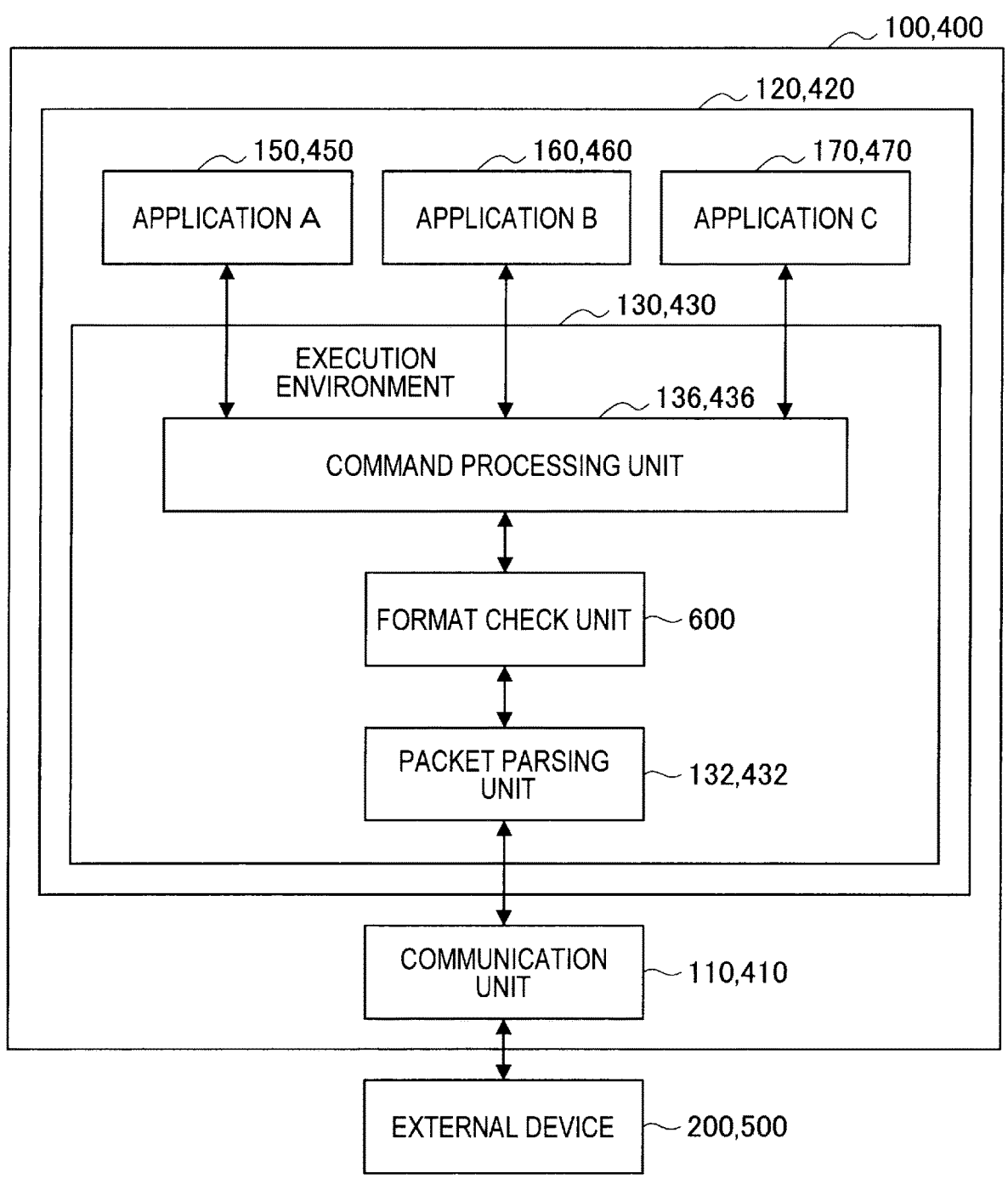
FIG. 9 is a block diagram mainly showing a schematic configuration of a variant of the information processing device according to each embodiment of the present invention.

Variant of Information Processing Device
According to Each Embodiment of the Present
Invention Hereinafter, a variant of the information processing device 100 or 400 according to each embodiment of the present invention will be described. FIG. 9 is a block diagram mainly showing a schematic configuration of the variant of the information processing device 100 or 400 according to each embodiment of the present invention. In FIG. 9, an external device 100 or 500 and the information processing device 100 or 400 is shown.

In FIG. 9, the information processing device 100 or 400 includes a communication unit 110 or 410, and an OS 120 or 420. The OS 120 or 420 includes an execution environment 130 or 430, application A 150 or 450, application B 160 or 460, and application C 170 or 470. The execution environment 130 or 430 mainly includes a packet parsing unit 132 or 432, a format check unit 600, and a command processing unit 136 or 436.

When a communication packet received by the communication unit 110 or 410 is input, the packet parsing unit 132 or 432 parses contents of the communication packet and identifies the type of a command for the OS 120 or 420 included in the communication packet. The packet parsing unit 132 or 432 inputs the command received from the external device 200 or 500 to the format check unit 600. The format check unit 600 performs check of a format of the command input from the packet parsing unit 132 or 432. When the command is found to be in a given format as a result of checking the command format, the format check unit 600 inputs the command to the command processing unit 136 or 436. The command processing unit 136 or 436 executes the command input from the format check unit 600.

Format Check Process

Figure 10:
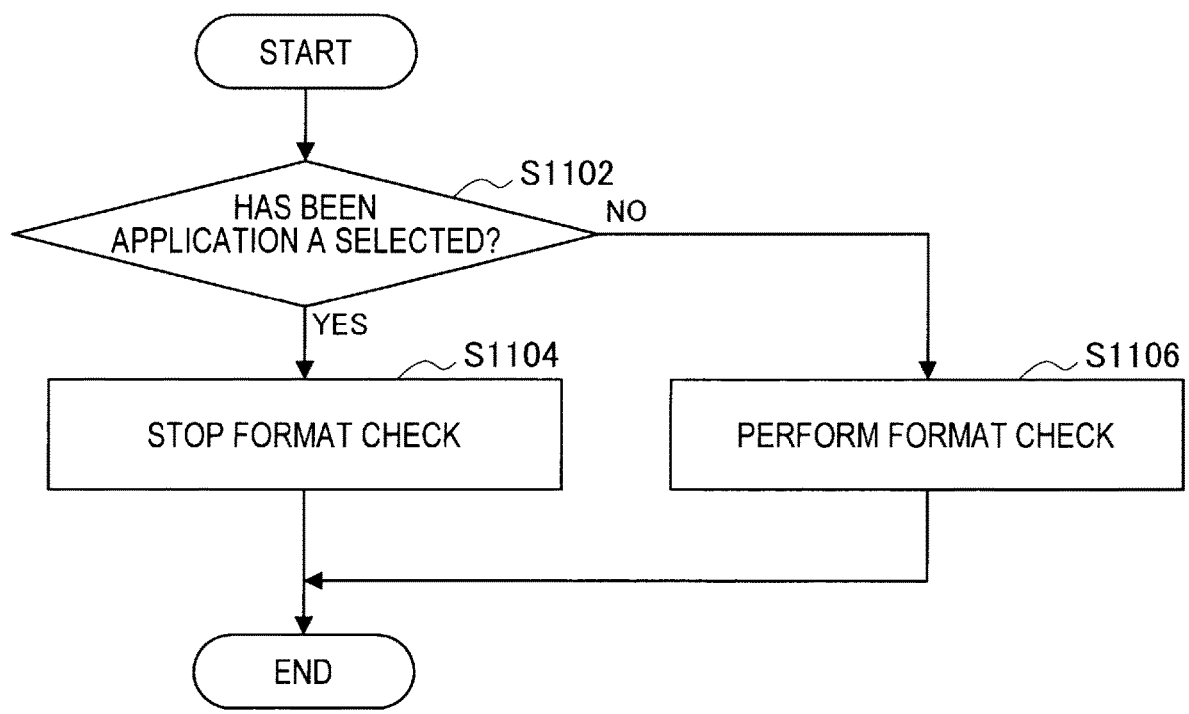
FIG. 10 is a flowchart of a format check process executed by the information processing device in FIG. 9.

Hereinafter, a format check process executed by the information processing device in FIG. 9 will be described. FIG. 10 is a flowchart of the format check process executed by the information processing device 100 or 400 in FIG. 9. In the present process, the information processing device 100 or 400 performs check of a format of a communication packet received from the external device 200 or 600 when executing the above-described information processing of FIG. 6 or 8. The present process is also executed by the format check unit 600 of the information processing device 100 or 400.

In FIG. 10, first, the format check unit 600 of the information processing device 100 or 400 discriminates whether application A 150 or 450 has been selected in the information processing device 100 or 400 as a result of executing the above-described information processing in FIG. 6 or 8 (step S1102).

When application A 150 or 450 is found to have been selected in the information processing device 100 or 400 as a result of the discrimination in step S1102 (YES in step S1102), the format check unit 600 of the information processing device 100 or 400 stops the check of the format of the command, that is, inputs all commands to the command processing unit 136 or 436 (step S1104), and the present process ends.

On the other hand, when application A 150 or 450 is found not to have been selected in the information processing device 100 or 400 as a result of the determination in step S1102 (NO in step S1102), the format check unit 600 of the information processing device 100 or 400 performs the check of the command format. When the command is in a given format, the format check unit 600 inputs the command to the command processing unit 136 or 436 (step S1106), and the present process ends.

According to the format check process in FIG. 10, when application A 150 or 450 has been selected in the information processing device 100 or 400, the check of the command format in the format check unit 600 stops. As described above, application A 150 or 450 is an application simulating the FeliCa OS, and when application A 150 or 450 is run on the execution environment 130 or 430 of the OS 120 or 420, the same processing result as generated when the FeliCa OS is run is obtained. Since a command input to the Java Card OS and a command input to the FeliCa OS have a different format, the command input to the FeliCa OS can be certainly delivered to the application simulating the FeliCa OS by stopping the check of the command format in the format check unit 600.

While in the format check process of FIG. 10, the determination is made as to whether the format check is necessary based on the application selection, the determination may be made as to whether the format check is necessary based on a form in which the communication unit 110 or 410 receives commands.

Because the communication unit 110 or 410 has a contactless communication function such as NFC, the communication unit 110 or 410 can realize a variety of input forms, such as communication with the external device or reception of commands from another device or chip connected to the communication unit, and the determination can be made as to whether the format check is necessary based on a communication path.

Another Format Check Process

Figure 11:
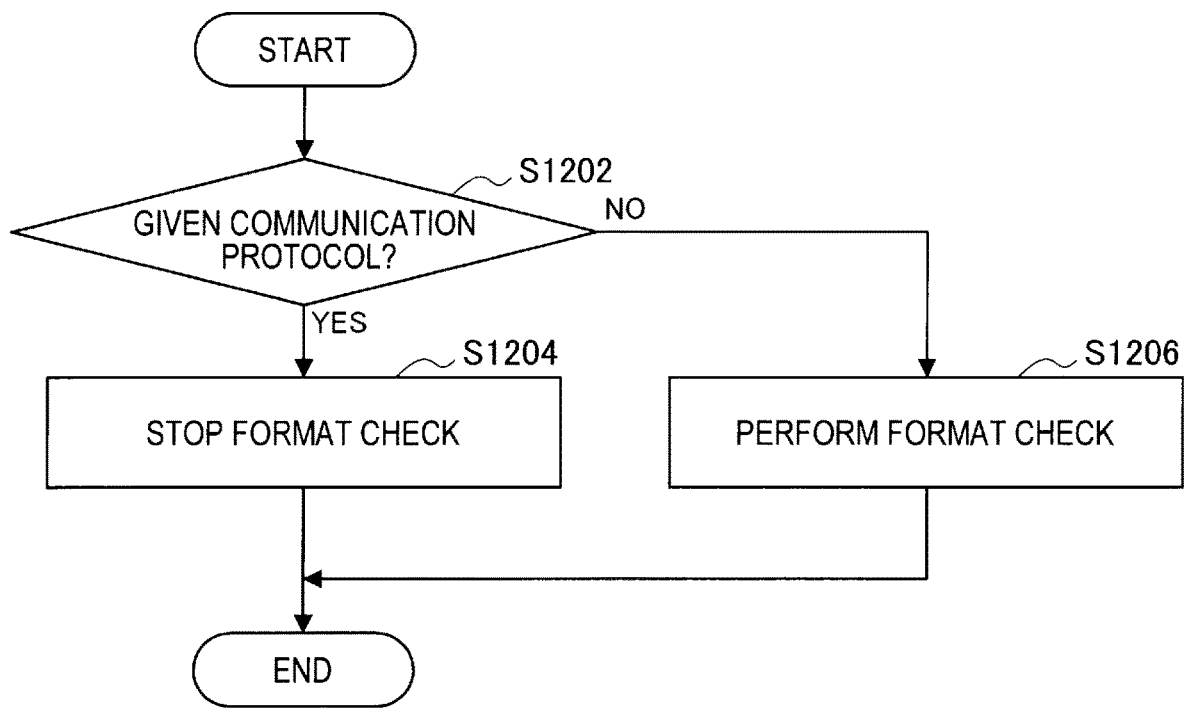
FIG. 11 is a flowchart of another format check process executed by the information processing device in FIG. 9.

Hereinafter, another format check process executed by the information processing device in FIG. 9 will be described. FIG. 11 is a flowchart of another format check process executed by the information processing device 100 or 400 in FIG. 9. In the present process, check of a format of a communication packet executed from the external device 200 or 600 is performed when the above-described information processing in FIG. 6 or 8 is executed in the information processing device 100 or 400. The present process is also executed by the format check unit 600 of the information processing device 100 or 400.

In FIG. 11, first, the format check unit 600 of the information processing device 100 or 400 discriminates whether a communication protocol in the information processing device 100 or 400 is found to be a given communication protocol as a result of executing the above-described information processing in FIG. 6 or 8 (step S1202).

When the communication protocol in the information processing device 100 or 400 is found to be a given communication protocol as a result of the determination in step S1202 (YES in step S1202), the format check unit 600 of the information processing device 100 or 400 stops the check of the command format, that is, inputs all commands to the command processing unit 136 or 436 (step S1204), and the present process ends.

On the other hand, when the communication protocol in the information processing device 100 or 400 is found to be a given communication protocol as a result of the discrimination in step S1202 (NO in step S1202), the format check unit 600 of the information processing device 100 or 400 performs check of the format of the command. When the command is in a given format, the format check unit 600 inputs the command to the command processing unit 136 or 436 (step S1206), and the present process ends.

According to the format check process in FIG. 11, when the communication protocol in the information processing device 100 or 400 is a given communication protocol, the command format check in the format check unit 600 stops. Application A 150 or 450 is an application simulating the FeliCa OS as described above, and when application A 150 or 450 is run on the execution environment 130 or 430 of the OS 120 or 420, the same processing result as generated when the FeliCa OS is run is obtained. Since a command input to the Java Card OS and a command input to the FeliCa OS differ in the format, the command input to the FeliCa OS can be certainly delivered to the application simulating the FeliCa OS by stopping the command format check in the format check unit 600.

Figure 12:
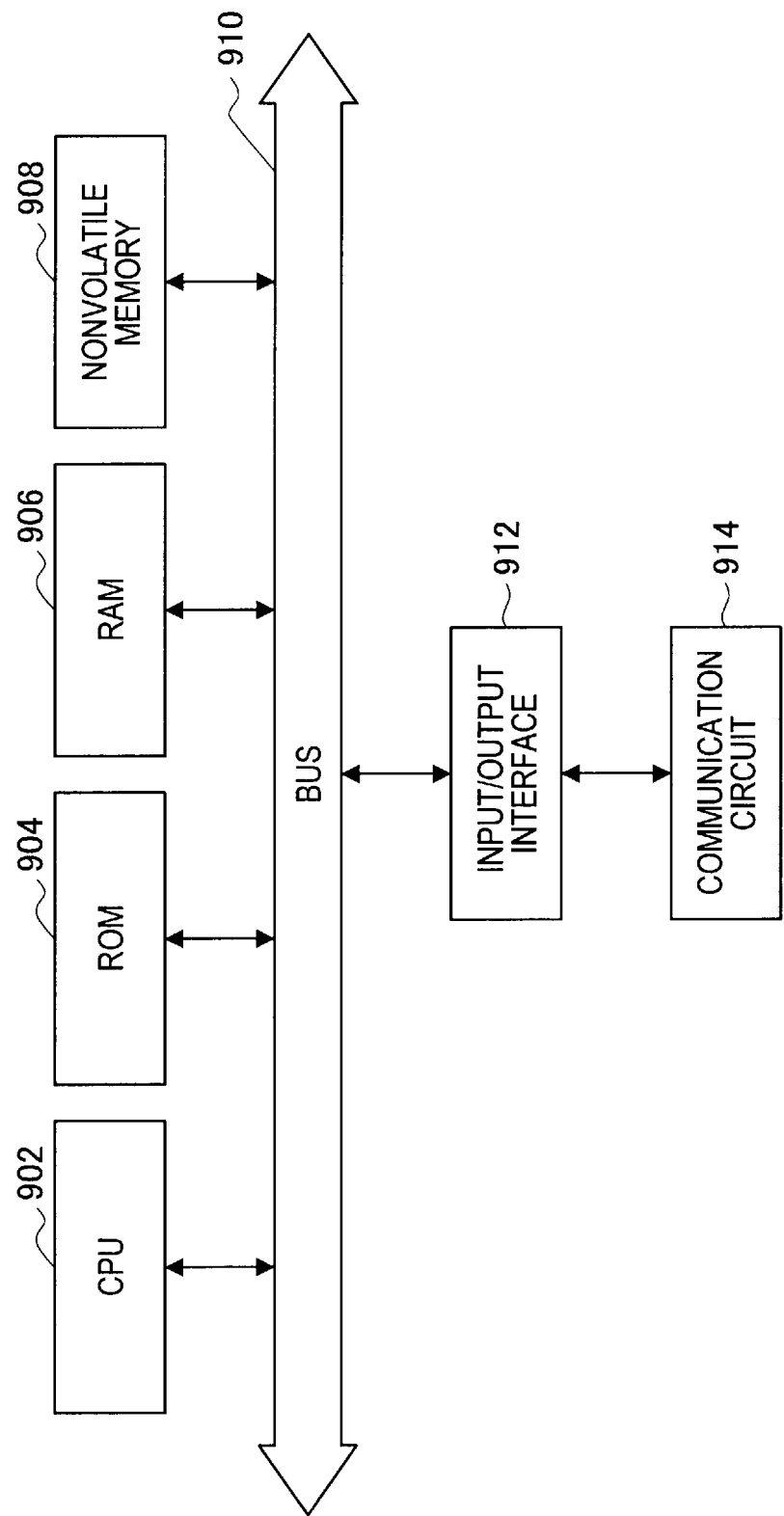
FIG. 12 is a block diagram showing an example of a configuration of hardware in which a series of processes operate according to each embodiment.

A series of processes according to the first and second embodiments described in this disclosure are typically realized by software that is run on a computer provided in the information processing device 100 or 400. FIG. 12 is a block diagram showing an example of a configuration of hardware in which the series of processes operate according to each embodiment.

In FIG. 12, a CPU 902 controls an overall operation of the information processing device 100 or 400. A program describing some or all of the series of processes or data is stored in a read only memory (ROM) 904. A program executed by the CPU 902, data, and the like are temporarily stored in a RAM 906. A nonvolatile memory 908 is, for example, an electrically erasable and programmable ROM (EEPROM) and can store applications to be added later.

The CPU 902, the ROM 904, the RAM 906, and the nonvolatile memory 908 are interconnected via a bus 910. An input/output interface 912 is also connected to the bus 910.

As the CPU 902 is connected to the ROM 904, the RAM 906, and the nonvolatile memory 908, the CPU 902 functions as the packet parsing unit 132 or 432, the application selection command generation unit 134, the command processing unit 136 or 436, the application selection unit 142 or 442, and the command execution unit 140 or 440 described above. A communication circuit 914 functions as the communication unit 110 or 410.

The input/output interface 912 is an interface for connecting the CPU 902, the ROM 904, the RAM 906, and the nonvolatile memory 908 to the communication circuit 914.

The communication circuit 914 transmits and receives a communication packet to and from the external device 200 or 500 according to given communication protocol. The communication circuit 914 may support, for example, contactless communication conforming to a standard specification of ISO014443 or contact communication conforming to a standard specification of ISO07816.

While the preferred embodiments of the present invention have been described in detail with reference to the accompanying drawings, the present invention is not limited to such embodiments. It should be understood by those skilled in the art that various modifications, combinations, subcombinations and alterations may occur depending on design requirements and other factors insofar as they are within the scope of the appended claims or the equivalents thereof.

For example, the processes described using FIGS. 6, 8, 10, and 11 may not necessarily be executed in the orders described in the flowcharts. The respective process steps may include processes that are executed in parallel or independently.

For example, the number of applications held by each OS is not limited to the number described in this disclosure. Applications can be added or deleted, for example, by rewriting the content of the above-described EEPROM, if necessary.

The invention claimed is:

1. An information processing device comprising:
   a receiving unit configured to perform contactless communication with an external device and receive a command to be input to a first operating system and a command to be input to an application simulating a second operating system;
   a discrimination unit configured to parse a content of a communication packet of the command received by the receiving unit and identify a type of the command included in the communication packet, wherein the discrimination unit is configured to discriminate among a plurality of types of commands including a command for acquiring identification information for the application simulating the second operating system and a command for selecting the application simulating the second operating system based on the identification information;
   a storage unit configured to store a table including associations between one or more predetermined information included in a given command received by the receiving unit and one or more application identification information, in which the predetermined information and the application identification information are related to each other;
   a generation unit configured to generate an application selection command for selectively executing an application based on the given command received by the receiving unit and the table stored in the storage unit; and
   an execution unit having the first operating system as a base for command execution, in which the execution unit is configured to execute the application selection command generated by the generation unit to selectively execute the application.

2. The information processing device according to claim 1, wherein the receiving unit is a Near Field Communication (NFC) unit.

3. The information processing device according to claim 1, wherein the receiving unit is configured to communicate with a Near Field Communication (NFC) unit.

4. The information processing device according to claim 1, wherein the first operating system is a Java Card operating system.

5. The information processing device according to claim 1, wherein the second operating system is a FeliCa operating system.

6. The information processing device according to claim 1, wherein the execution unit is configured to output the same processing result as generated by the second operating system by executing a given application on an execution environment of the first operating system.

7. The information processing device according to claim 1, wherein the given command is an information acquisition command for selecting a given memory area corresponding to the second operating system, and
   the predetermined information is area information for identifying the given memory area, included in the information acquisition command.

8. The information processing device according to claim 7, wherein the discrimination unit is configured to discriminate the content of the command, by discriminating whether the command is an application selection command type included in the plurality of types of commands after discriminating whether the command is an information acquisition command type included in the plurality of types of commands.

9. The information processing device according to claim 1, further comprising:
   a format check unit configured to perform check of a format of the command received by the receiving unit,
   wherein the format check unit stops the check of the format of the command when a given application is executed by the execution unit.

10. The information processing device according to claim 1, wherein when the receiving unit receives a first command, a determination of a response corresponding to the first command is made based on a state of a response flag added to the table stored in the storage unit.

* * * * *